United States Patent
Wu

(10) Patent No.: US 9,910,492 B2
(45) Date of Patent: Mar. 6, 2018

(54) STEREOSCOPIC TOUCH DEVICE AND DISPLAY DEVICE

(71) Applicant: BOE TECHNOLOGY GROUP CO., LTD., Beijing (CN)

(72) Inventor: Naifu Wu, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 539 days.

(21) Appl. No.: 14/394,343

(22) PCT Filed: Dec. 3, 2013

(86) PCT No.: PCT/CN2013/088364
§ 371 (c)(1),
(2) Date: Oct. 14, 2014

(87) PCT Pub. No.: WO2015/007042
PCT Pub. Date: Jan. 22, 2015

(65) Prior Publication Data
US 2015/0309574 A1    Oct. 29, 2015

(30) Foreign Application Priority Data

Jul. 19, 2013    (CN) .......................... 2013 1 0306212

(51) Int. Cl.
*G09G 1/00* (2006.01)
*G06F 3/01* (2006.01)
(Continued)

(52) U.S. Cl.
CPC ................ *G06F 3/016* (2013.01); *G06F 3/01* (2013.01); *G06F 3/0412* (2013.01);
(Continued)

(58) Field of Classification Search
CPC .. H04W 88/02; G06F 1/00; G06F 3/00; G06F 3/04883; G06F 3/0488
See application file for complete search history.

(56) References Cited

U.S. PATENT DOCUMENTS

2012/0329527 A1* 12/2012 Kang ................. H04N 13/0059
                                                      455/566
2013/0023258 A1*  1/2013 Choi .................... H04M 1/7253
                                                      455/418

FOREIGN PATENT DOCUMENTS

CN         102891706 A      1/2013
CN         103412410 A     11/2013
(Continued)

OTHER PUBLICATIONS

Second Chinese Office Action of Chinese Application No. 201310306212.8, dated May 14, 2015 with English translation.
(Continued)

*Primary Examiner* — Michael Faragalla
(74) *Attorney, Agent, or Firm* — Collard & Roe, P.C.

(57) ABSTRACT

A stereoscopic touch device and a display device are provided. The stereoscopic touch device is arranged in the front of the stereoscopic display panel and comprises: an air injection panel which comprises a plurality of air injection holes in array distribution thereon; an image processing chip which generates a control signal for controlling strengths of airflows from respective air injection holes depending on a stereoscopic image signal; an airflow regulating device which is in signal connection with the image processing chip and is configured for providing air with the airflow strengths to the respective air injection holes depending on the control signal.

14 Claims, 3 Drawing Sheets

(51) Int. Cl.
  *H04N 13/04* (2006.01)
  *G06F 3/041* (2006.01)
  *G06F 3/0481* (2013.01)
  *G06F 3/0484* (2013.01)
  *G06F 3/0488* (2013.01)
(52) U.S. Cl.
  CPC ........ *G06F 3/0488* (2013.01); *G06F 3/04815* (2013.01); *G06F 3/04842* (2013.01); *H04N 13/04* (2013.01); *H04N 13/0438* (2013.01); *G06F 2203/04101* (2013.01); *G06F 2203/04808* (2013.01)

(56) References Cited

FOREIGN PATENT DOCUMENTS

| | | |
|---|---|---|
| JP | 2005-4580 A | 1/2005 |
| JP | 2013-81668 A | 5/2013 |

OTHER PUBLICATIONS

English translation of the International Preliminary Report on Patentability and Written Opinion of the International Searching Authority of PCT/CN2013/088364, dated Jan. 19, 2016.
English Translation of the International Search Report of PCT/CN2013/088364 published in English dated Jan. 22, 2015.
International Search Report, International Preliminary Report on Patentability and Written Opinion of the International Searching Authority of PCT/CN2013/088364 in Chinese, dated Dec. 3, 2013.

\* cited by examiner

STEREOSCOPIC TOUCH DEVICE AND DISPLAY DEVICE

CROSS REFERENCE TO RELATED APPLICATIONS

This application is the National Stage of PCT/CN2013/088364 filed on Dec. 3, 2013, which claims priority under 35 U.S.C. § 119 of Chinese Application No. 201310306212.8 filed on Jul. 19, 2013, the disclosure of which is incorporated by reference.

TECHNICAL FIELD

Embodiments of the invention relate to a stereoscopic touch device and a display device.

BACKGROUND

In daily life, people observe surrounding external scene with two eyes in a spatial stereoscopic sense. Through 3D stereoscopic display technology, people can feel the sense of 3D stereoscopic space through a two-eye stereoscopic vision principle, mainly on the basis that the left eye and right eye of a viewer respectively receive different images which are analyzed and combined by the brain, so that the viewer can obtain the stereoscopic sense.

At present, 3D stereoscopic display technology includes two types, i.e., glassless type and glass type. In the glassless stereoscopic display technology, a stereoscopic display part is arranged on a display panel and coded 3D video images are respectively transmitted to people's left and right eyes independently, so that the user can experience stereoscopic sense with naked eyes rather than wearing stereoscopic glasses.

However, no matter through relatively mature glass stereoscopic display technology or through emerging glassless stereoscopic display technology, people, can "see" stereoscopic display effect only, but stereoscopic display effect cannot be felt through touching.

SUMMARY

In one aspect, an embodiment of the present invention provides a stereoscopic touch device. The stereoscopic touch device comprises: an air injection panel which comprises a plurality of air injection holes in array distribution thereon; an image processing chip which generates a control signal for controlling strengths of airflows from respective air injection holes depending on a stereoscopic image signal; an airflow regulating device which is in signal connection with the image processing chip and is configured for providing air with the airflow strengths to the respective air injection holes depending on the control signal.

In one aspect, an embodiment of the present invention provides a display device. The display device comprises a stereoscopic display panel and a stereoscopic touch device on a light emission side of the stereoscopic display panel, wherein the stereoscopic touch device is as mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Sizes and shapes of various parts in the attached drawings do not reflect the actual scales of the stereoscopic touch device, and are just for schematic illustration of the embodiments of the present invention.

First Embodiment

The embodiment provides a stereoscopic touch device, which comprises: an air injection panel which comprises a plurality of air injection holes in array distribution thereon; an image processing chip which generates a control signal for controlling strengths of airflows from respective air injection holes depending on a stereoscopic image signal; and an airflow regulating device which is in signal connection with the image processing chip and is configured for providing air with the airflow strengths to the respective air injection holes depending on the control signal.

In the stereoscopic touch device provided according to the embodiment, airflow strengths of air from the respective air injection holes in the air injection panel are controlled by the airflow regulating device; when stereoscopic image is displayed on the stereoscopic display panel, an airflow shape matching with the stereoscopic image is formed in front of the air injection panel; the stereoscopic image can be observed through combination of the touchable airflow shape varying in height, so as to better experience the stereoscopic effect.

For example, the image analysis chip generates the control signal for controlling airflow strengths from the respective air injection holes depending on the stereoscopic image signal in the following ways:

Firstly, the image analysis chip analyzes the stereoscopic image signal to obtain 3D parallax of various pixel points in the stereoscopic image to be displayed. The 3D parallax of the stereoscopic image can be determined in ways such as conventional color and parallax spatial information segmentation technology, which is not described in detail here.

Figure 1:
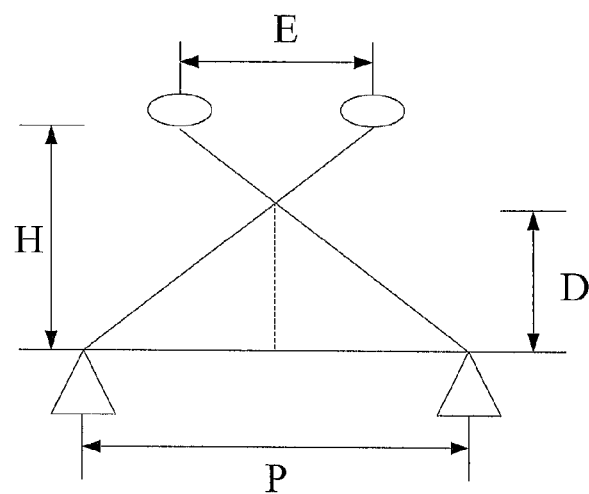
FIG. 1 is a principle schematic diagram of stereoscopic strength of an image that is determined based on a parallax.

Then, depending on a triangular similarity principle, as shown in FIG. 1, depths of field, i.e., stereoscopic strengths D=H×P/(E+P), of various pixel points in the stereoscopic image are obtained, so as to generate stereoscopic strength distribution of each frame of stereoscopic image, where P represents the parallax of two viewpoints (two views), E is a pupil distance, and H is a viewing distance. Generally, the pupil distance E is a constant value of 65 mm, and the viewing distance H can be basically determined depending on the size of the stereoscopic display panel.

Finally, the control signal for controlling airflow strengths of the respective air injection holes is generated depending on stereoscopic strength distribution of the stereoscopic image, and the control signal is transmitted to a corresponding airflow regulating device. Generally, the airflow strength of the air injection hole is higher if the region corresponding to the air injection hole has a higher stereoscopic strength in the stereoscopic image, so that the stereoscopic shape formed by the air from the respective air injection holes is closer to a real object shape, so as to achieve a better stereoscopic display effect.

Hereinafter, the stereoscopic touch device provided according to the embodiment is described in detail in conjunction with attached drawings.

Example I

Figure 2:
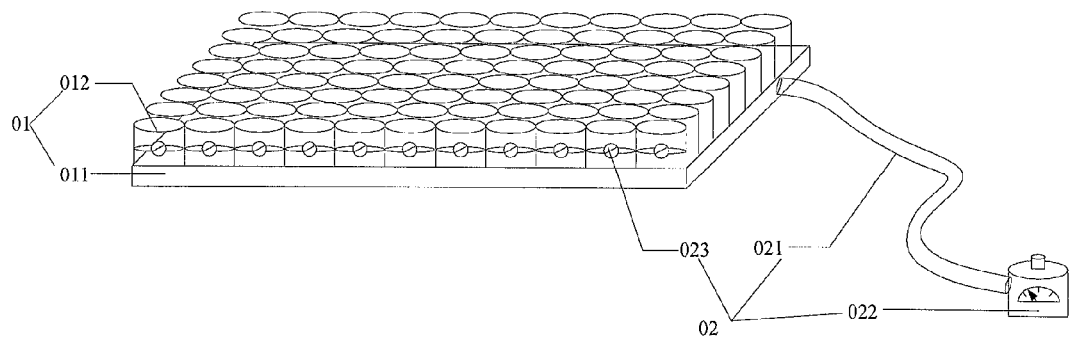
FIG. 2 is a schematic diagram of the stereoscopic touch device in example I according to a first embodiment of the present invention.

As shown in FIG. 2, an air cavity 011 is formed within the air injection panel 01 of the stereoscopic touch device, and air inlets of respective air injection holes 012 are communicated with the air cavity 011.

As shown in FIG. 2, the airflow regulating device 02 comprises: an air source device 022, control devices 023 and at least one air delivery pipe 021. The air source device 022 is communicated with the air cavity 011 through the at least one air delivery pipe 021, and the control devices 23 correspond to the air injection holes 012 one by one.

The control devices 023 can regulate airflow strengths of air from the air injection holes 012 depending on the control signal from the image processing chip.

Figure 3:
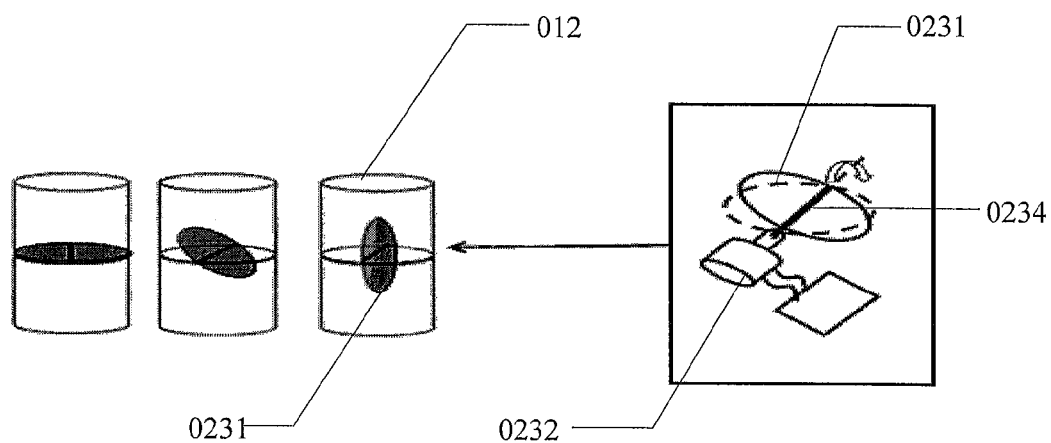
FIG. 3-FIG. 5 are schematic diagrams of the airflow regulating device of the stereoscopic touch device in example I; according to the first embodiment of the present invention.

As shown in FIG. 3, the control device 023, for example, may comprise: pivots 0234 in the air injection hole 012, a transparent baffle sheet 0231 capable of rotating around the pivot 0234 and a driving device 0232 for controlling rotating angle of the transparent baffle sheet 0231.

Figure 4:
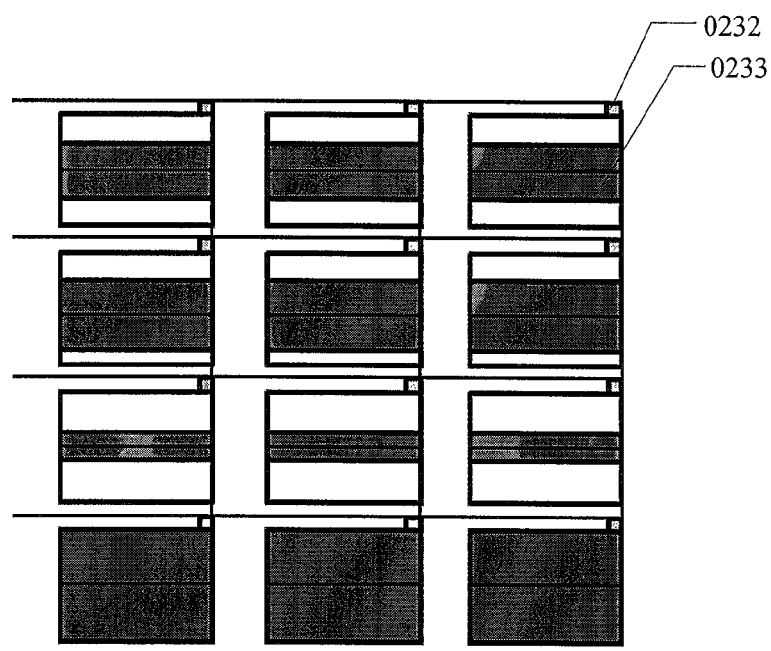

Alternatively, as shown in FIG. 4, the control device 023, for example, may comprise: a transparent exhaust grille 0233 in the air injection hole 012, and a driving device 0232 for controlling air guidance area of the air injection hole 012 sheltered by the transparent exhaust grille 0233.

Figure 5:
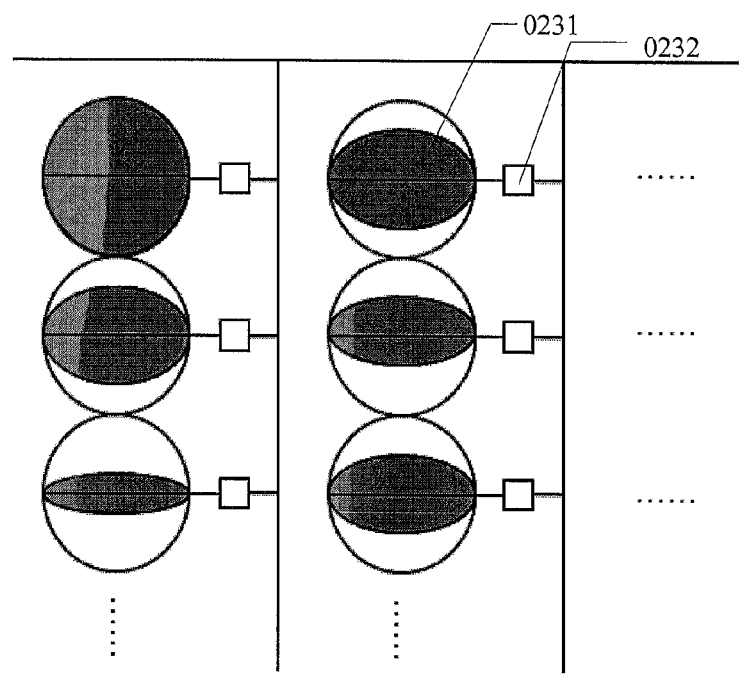

After rotating the transparent baffle sheet 0231 to a different angle as shown in FIG. 5 or after opening the transparent exhaust grille 0233 to a different degree as shown in FIG. 4, the air guidance area of the air injection hole 012 is changed. The air guidance area of the air injection hole 012 is subjected to the following relation with the stereoscopic strength: M1=P*S1, M0=P*S0, where M1 represents the maximum value of the stereoscopic strength and M2 stands for the minimum value of the stereoscopic strength, S1 is the air guidance area after the air injection hole is completely opened, S0 is the air guidance area after the air injection hole is closed, and P is the air pressure maintained in the air cavity of the air injection panel.

For example, the driving device 0232 is a motor or an electric engine, which is not limited here.

It is important to note that the air injection holes 012 in the air injection panel 01, not limited in round holes, can be square holes or holes in another shape, which is not limited here. FIG. 4 and FIG. 5 just schematically illustrate that the control device 023 can employ the transparent baffle sheet 0231 and the driving device 0232 for controlling the rotating angle of the transparent baffle sheet 0231 when the air injection hole 012 is a round hole, and the control device 023 can employ the exhaust grille 0233 and the driving device 0232 for controlling air guidance area of the air injection hole 012 sheltered by the transparent exhaust grille 0233 when the air injection hole 012 is a square hole.

The air source device 022 is configured for continuously providing air under a certain pressure to the air cavity 011 of the air injection panel 01 through the air delivery pipe 021. For example, the air source device 022 can be an air compressor or an air blower, which is not limited here.

Furthermore, in order to guarantee a relatively high stability of the air pressure in the air cavity 011 of the air injection panel 01, a plurality of air inlets can be uniformly arranged on the sidewall of the air cavity 011, so that air from the air source device 022 is stably inputted into the air cavity 011 of the air injection panel 01 through the multiple air delivery pipes 021.

Example II

Except for the airflow regulating device, the stereoscopic touch device of the example is basically identical with that of the first example.

Figure 6:
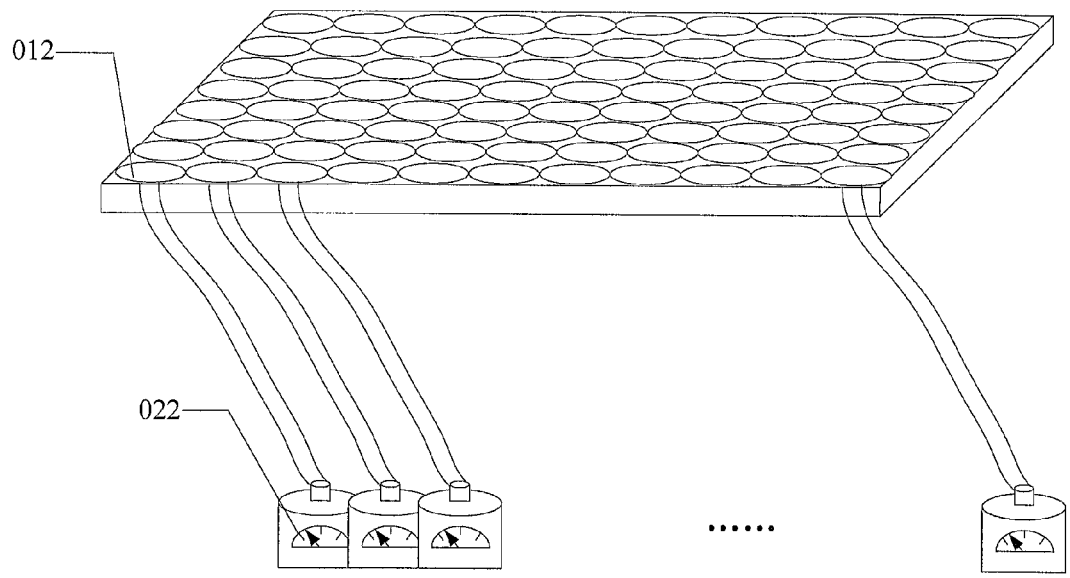
FIG. 6 is a schematic diagram of the stereoscopic touch device in example II according to the first embodiment of the present invention.

As shown in FIG. 6, the airflow regulating device according to the example comprises: air source devices 022 corresponding to the air injection holes 012 one by one, and a control device (not shown in FIG. 6) for controlling air pressure strength of the air source devices 022.

Each air source device 022 can be connected to the corresponding air injection hole 012 through a transparent air duct, and airflow strengths from the air source devices 022 are regulated by the control device. For example, each air source device 022 can be an air compressor or an air blower, which is not limited here. For example, the control device can be a power supply control circuit of the air blower or the air compressor, to control the power of the air blower or the air compressor so as to control pressure of air from the air blower or the air compressor. In addition, the control device can be another type of control circuit externally connected to the air source device 022, which is not limited here.

Furthermore, to avoid influence on viewer's viewing effect by the noise generated by the air injection panel when injecting air, a noise reduction device can be arranged in front of the air injection holes of the air injection panel; the noise reduction device can adopt any conventional noise reduction device, which is not described in detail here.

Furthermore, the stereoscopic touch device according to the embodiment is generally arranged between the stereoscopic display panel and the viewer; therefore, the influence on the viewer to view picture displayed by the stereoscopic display panel is avoided, and the air injection panel is mainly made of a transparent material. Moreover, to guarantee that the airflow shape formed in front of the air injection panel is closer to a real stereoscopic image, an area of respective air injection holes in the air injection panel should be as small as possible, preferably be consistent with the size of pixel unit of the stereoscopic display panel.

Embodiment Two

An embodiment of the present invention provides a display device. The display device comprises a stereoscopic display panel and a stereoscopic touch device on a light emission side of the stereoscopic display panel; the stereoscopic touch device is the stereoscopic touch device as mentioned in the first embodiment of the present invention. Generally, the stereoscopic display panel may be a stereoscopic display part on a conventional display panel. For example, the conventional display panel is provided with a parallax baffle plate. The stereoscopic display panel may be a conventional stereoscopic display panel as well, for example, a shutter type stereoscopic display. The display device can be any products or parts having display function such as mobile phone, tablet computer, television, display, notebook computer, digital photo frame and navigator. As the stereoscopic touch device of the display device is similar with the stereoscopic touch device according to first embodiment, implementation of the display device can refer to implementation of the stereoscopic touch device, and the repeated description will not be given here.

Furthermore, in the display device according to the embodiment, the stereoscopic touch device can be detachably arranged on the light emission side of the stereoscopic display panel, so it is easy to take down the stereoscopic touch device covering the front side of the stereoscopic display panel when the stereoscopic display panel implements two-dimensional display. Certainly, the stereoscopic touch device can be fixed on the light emission side of the stereoscopic display panel, which is not limited here.

The embodiments of the present invention provide a stereoscopic touch device and a display device. The stereoscopic touch device is arranged in the front of the stereoscopic display panel, and comprises: an air injection panel which comprises a plurality of air injection holes in array distribution, an image processing chip for generating a control signal for controlling airflow strengths of respective air injection holes depending on a stereoscopic image signal, and an airflow regulating device which is in signal connection with the image processing chip and is configured for providing air with the airflow strengths to the respective air injection holes. The stereoscopic touch device can control the airflow strength of air from the respective air injection holes in the air injection panel through the airflow regulating device; an airflow shape matching with the stereoscopic image is formed in front of the air injection panel when the stereoscopic image is displayed on the stereoscopic display panel; the stereoscopic image can be observed through combination of the touched airflow shapes varying in height, so as to better experience the stereoscopic effect.

The foregoing embodiments merely are exemplary embodiments of the invention, and not intended to define the scope of the invention, and the scope of the invention is determined by the appended claims.

The invention claimed is:

1. A stereoscopic touch device, comprising:
 an air injection panel which comprises a plurality of air injection holes in array distribution thereon;
 an image processing chip which generates a control signal for controlling strengths of airflows from respective air injection holes depending on a stereoscopic image signal;
 an airflow regulating device which is in signal connection with the image processing chip and is configured for providing air with the airflow strengths to the respective air injection holes depending on the control signal, wherein an air cavity is formed inside the air injection panel, and air inlets of the respective air injection holes are communicated with the air cavity;
the airflow regulating device comprises: an air source device, control devices and at least one air delivery pipe; wherein the air source device is communicated with the air cavity through the at least one air delivery pipe, and the control devices correspond to the air injection holes one by one;
wherein each control device comprise: a pivot in the air injection hole, a transparent baffle sheet capable of rotating around the pivot, and a driving device for controlling a rotating angle of the transparent baffle sheet; or,
the control device comprises: a transparent exhaust grille in the air injection hole, and a driving device for controlling an air guidance area of the air injection hole sheltered by the transparent exhaust grille.

2. The stereoscopic touch device according to claim 1, wherein the driving device is a motor or an electric engine.

3. The stereoscopic touch device according to claim 1, wherein the airflow regulating device comprises: air source devices corresponding to the air injection holes one by one, and a control device for controlling air pressure strength of the air source device.

4. The stereoscopic touch device according to claim 1, wherein the air source device can be an air compressor or an air blower.

5. The stereoscopic touch device according to claim 1, wherein a noise reduction device is arranged in front of the air injection holes of the air injection panel.

6. The stereoscopic touch device according to claim 1, wherein the air injection panel is made of a transparent material.

7. A display device, comprising: a stereoscopic display panel and a stereoscopic touch device on a light emission side of the stereoscopic display panel, wherein the stereoscopic touch device is the stereoscopic touch device according to claim 1.

8. The display device according to claim 7, wherein the stereoscopic touch device is detachably arranged on the light emission side of the stereoscopic display panel.

9. The display device according to claim 7, wherein air injection holes in the air injection panel of the stereoscopic touch device have a size consistent with pixel units of the stereoscopic display panel.

10. The stereoscopic touch device according to claim 3, wherein the air source device can be an air compressor or an air blower.

11. The stereoscopic touch device according to claim 1, wherein a noise reduction device is arranged in front of the air injection holes of the air injection panel.

12. The stereoscopic touch device according to claim 1, wherein the air injection panel is made of a transparent material.

13. The stereoscopic touch device according to claim 3, wherein a noise reduction device is arranged in front of the air injection holes of the air injection panel.

14. The stereoscopic touch device according to claim 3, wherein the air injection panel is made of a transparent material.

* * * * *